D. F. CANNON.
PROCESS FOR MAKING UPRIGHT TUILLES.
APPLICATION FILED NOV. 14, 1918.

1,309,936.

Patented July 15, 1919.
2 SHEETS—SHEET 1.

INVENTOR
D. F. Cannon
by
James C. Bradley
atty.

D. F. CANNON.
PROCESS FOR MAKING UPRIGHT TUILLES.
APPLICATION FILED NOV. 14, 1918.
1,309,936.
Patented July 15, 1919.
2 SHEETS—SHEET 2.
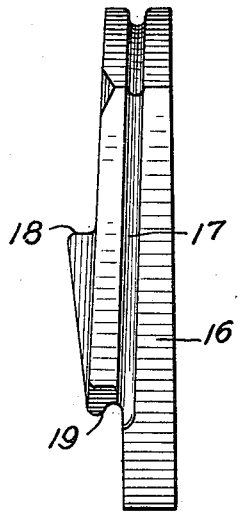
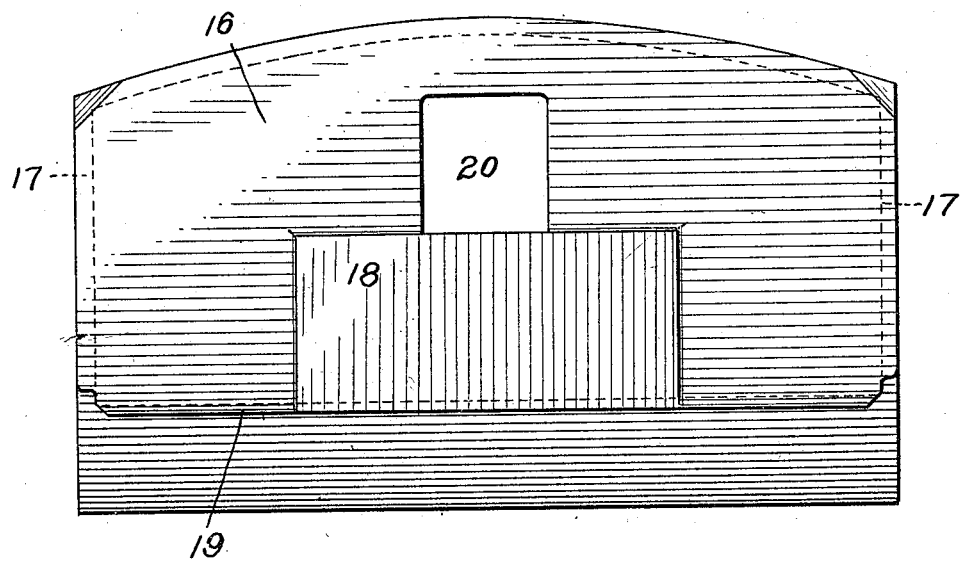

UNITED STATES PATENT OFFICE.

DOMINIC F. CANNON, OF FORD CITY, PENNSYLVANIA, ASSIGNOR TO PITTSBURGH PLATE GLASS COMPANY, A CORPORATION OF PENNSYLVANIA.

PROCESS FOR MAKING UPRIGHT TUILLES.

1,309,936.      Specification of Letters Patent.      Patented July 15, 1919.

Application filed November 14, 1918. Serial No. 262,427.

*To all whom it may concern:*

Be it known that I, DOMINIC F. CANNON, a citizen of the United States, and a resident of Ford City, in the county of Armstrong and State of Pennsylvania, have made a new and useful Invention in Processes for Making Upright Tuilles, of which the following is a specification.

Figure 1:
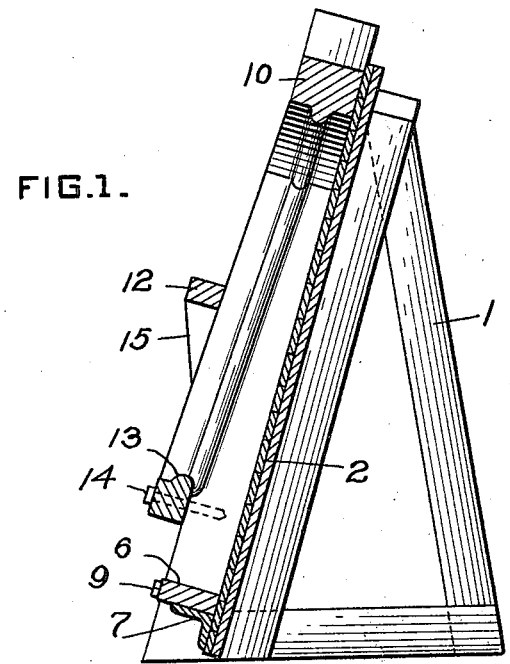
Figure 2:
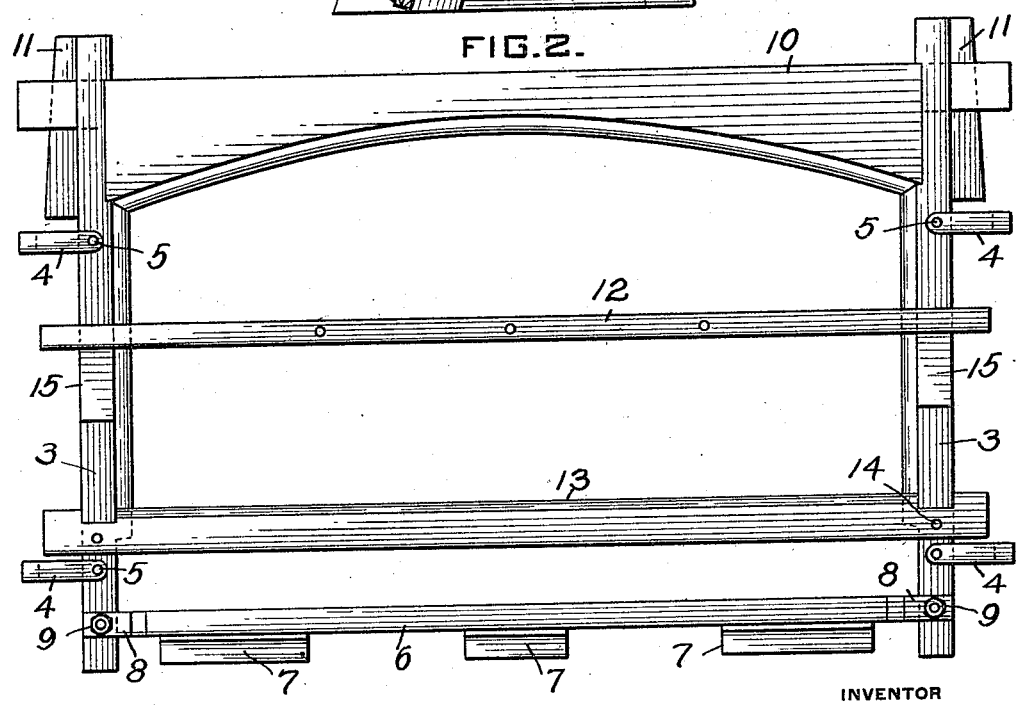

The invention relates to a method for making the tuilles employed in glass furnaces. It has for its principal objects, the provision of an improved method, (1) by the use of which, the time of drying as compared with the time heretofore required can be greatly reduced, (2) which can be practised with a minimum amount of floor space, (3) which will produce more durable tuilles than the processes heretofore employed, (4) and in which the labor of handling is reduced. The method is illustrated in the accompanying drawings, wherein;

Figure 1 is a vertical section through a mold used in making the tuilles. Fig. 2 is a front elevation of the mold of Fig. 1. Fig. 3 is side elevation of one of the tuilles and Fig. 4 is a front elevation of the tuilles of Fig. 3.

Tuilles as used in glass furnaces are made of fire clay and are about eight feet in length and five feet in width, with a thickness ranging from seven to ten inches, weighing about 3000 pounds, and have heretofore been made in mold or form which lies in a horizontal position, the mold comprising a bottom or back board and edge boards. The clay was tamped into position by hand or pneumatic tampers. After the clay had set, the edge boards were removed and the tuille was allowed to dry for a period of from six to eight weeks. The back board carrying the tuille was then raised to an upright position and still further drying was carried on. This process was not only very slow but required a great amount of floor space and the lifting involved very heavy labor and imposed more or less strain upon the tuille tending to crack or weaken it and reduce its life.

The new process, consisting of the invention herein, is designed to lessen the time necessary for drying and reduce the amount of floor space necessary. In carrying out the process, a mold is employed which occupies approximately a vertical position instead of the horizontal position. A mold is used which is similar to that used in the old process but is placed in an upright position and the clay is tamped into position commencing at the lower edge of the mold and working up to the top. After the clay has set, the edge boards are removed and the clay permitted to dry, the time required being much less than with the old process, the tuilles produced being much more durable and the trouble and labor expended in getting the tuilles into a vertical position being entirely eliminated.

The apparatus includes a framework 1, to the front side of which is secured the back board 2, of the form or mold, such back boards being in two courses extending at right angles to each other, as indicated in Fig. 1. The side edges of the mold comprise the removable boards 3, 3, to which the back board 2, is secured by means of U shaped clamps 4 held in position by the bolts 5. The lower edge board 6 rests upon the angle irons 7, secured to the back board and is held at the ends by the short metal plates 8, such short plates being secured in position upon the boards 3, 3, by means of bolts 9, and being adapted to swing around the bolts to release the ends of the large boards 6.

The upper edge board of the mold comprises the member 10 whose ends extend through suitable openings in the upper ends of the boards 3, 3, and are held in position by the wedges 11. The members 12 and 13 extend transversely of the mold, the member 13 being held by the pins 14, while the member 12 is supported upon the triangular blocks 15 secured to the member 3.

The article produced is shown in Fig. 3, such article comprising the body of clay 16 with the groove 17 for the metal edge bar which reinforces the tuille. The projections 18 and 19 are formed against the bar members 12 and 13, the recess at the lower side of the projection 19 serving to receive the transverse iron bar to the ends of which the ends of the bar lying in the groove 17 are attached. The usual opening 20 is cut from the tuille. In forming the tuille, the clay is tamped into the mold, as shown in Figs. 1 and 2, and after being allowed to set for some time, the edge members 3, 3, and 10 are removed, and a further drying of the clay permitted with the tuille supported upon the lower edge member 6 and the back board 2.

After the tuille has dried a short time in this inclined position it is tilted to a vertical position. At such time blocks are positioned upon the ground beneath the board 6 and intermediate the brackets 7, so that in tilting from the position of Fig. 1 to a vertical position, the weight of the board 6 and the tuille imposed thereon is transferred from the brackets 7 to the blocks. The back board 2 and frame 1 are now removed, leaving the tuille exposed on all sides to the drying action of the air. After the drying is completed in this position, the tuilles are removed to the firing arch upon trucks, and while still in vertical position on the bottom boards 6, such boards being burned away during the firing operation.

The time for drying under these conditions ranges from four to five weeks, being only approximately one half of the time required by the old method. The labor of raising the tuille from the horizontal to the vertical position, is avoided in this method, since the tuille is formed in the vertical position. The tuille, as thus produced, is free from strains and cracks and is much more durable than tuilles heretofore constructed. In actual service the tuilles produced have lasted much longer than those produced by the old method. A further advantage over the old method results from the economy in space, since a much larger number of tuilles can be dried in a given space, a part of the advantage being due to the rapidity in drying, and part to the fact that the floor space occupied by the device of Figs. 1 and 2 is much less than that occupied by a mold when used in a horizontal position. The inclined position employed for the form as shown in Fig. 1 also facilitates the filling of the mold with clay and the tamping of it into position. The circulation of air around the tuilles when in inclined position is much better than is the case with the tuilles drying in a horizontal position on the ground, and the back board does not hold the moisture in the clay to such an extent, which fact partly accounts for the large reduction in time of drying which is secured by the present method. Other advantages incident to the method will be readily apparent to those skilled in the art.

What I claim is:

1. The method of making clay tuilles which consists in tamping the clay into a mold with such mold in an upright position, but inclined away from a vertical plane, removing the upper and lateral sides of the mold and permitting the tuille to dry in an upright position while resting upon the lower side of the mold and against the back board.

2. The method of making clay tuilles which consists in tamping the clay into a mold with such a mold in an upright position but inclined away from a vertical plane, permitting the tuille to partially dry while supported by the lower side of the mold and back board, moving the tuille to vertical position, removing the back board and permitting a further drying in such vertical position.

3. The method of making clay tuilles which consists in tamping the clay into a mold with such mold in an upright position but inclined away from a vertical plane, removing the upper and lateral sides of the mold, permitting the tuille to partially dry, moving the tuille to vertical position, removing the back board, and permitting a further drying of the tuille in vertical position.

In testimony whereof, I have hereunto subscribed my name this 31st day of October, 1918.

DOMINIC F. CANNON.

Witness:
    EMMA BURGE.

Copies of this patent may be obtained for five cents each, by addressing the "Commissioner of Patents, Washington, D. C."